(12) United States Patent
With

(10) Patent No.: US 10,427,917 B2
(45) Date of Patent: Oct. 1, 2019

(54) MEANS CONCERNING HOOK

(71) Applicant: SUBSEA TOOLPOOL NORD AS, Tromso (NO)

(72) Inventor: Kaare With, Tromso (NO)

(73) Assignee: SUBSEA TOOLPOOL NORD AS, Tromso (NO)

( * ) Notice: Subject to any disclaimer, the term of this patent is extended or adjusted under 35 U.S.C. 154(b) by 0 days.

(21) Appl. No.: 15/775,061

(22) PCT Filed: Nov. 7, 2016

(86) PCT No.: PCT/NO2016/000028
§ 371 (c)(1),
(2) Date: May 10, 2018

(87) PCT Pub. No.: WO2017/126972
PCT Pub. Date: Jul. 27, 2017

(65) Prior Publication Data
US 2018/0319632 A1  Nov. 8, 2018

(30) Foreign Application Priority Data
Nov. 12, 2015 (NO) .................................. 20151544

(51) Int. Cl.
*B66C 1/36* (2006.01)
*B66C 1/34* (2006.01)
*F16B 45/02* (2006.01)

(52) U.S. Cl.
CPC .................. *B66C 1/36* (2013.01); *B66C 1/34* (2013.01); *F16B 45/02* (2013.01)

(58) Field of Classification Search
CPC .............. B66C 1/36; B66C 1/34; F16B 45/02
See application file for complete search history.

(56) References Cited

U.S. PATENT DOCUMENTS

| 219,677 | A |   | 9/1879 | Blakeman |  |
|---|---|---|---|---|---|
| 921,286 | A | * | 5/1909 | Saunders | .................. B66C 1/36 24/599.1 |
| 2,603,524 | A |   | 12/1948 | Amelung |  |

(Continued)

FOREIGN PATENT DOCUMENTS

| GB | 1032584 | 6/1966 |
|---|---|---|
| GB | 2417521 | 3/2006 |

(Continued)

OTHER PUBLICATIONS

PCT Search Report and Written Opinion for PCT/NO2016/000028 completed Jan. 20, 2017.

(Continued)

*Primary Examiner* — Stephen A Vu
(74) *Attorney, Agent, or Firm* — Barnes & Thornburg LLP

(57) ABSTRACT

Support assembly (F5.13.1) moving sliding assembly (F5.13.3), position lock assembly (F5.13.6), push lock rod (F5.13.8), tension spring (F5.13. I0)), threaded cap (F5.13.1 1) and release handle (F5.13.12). Bolt holes (F5.13.2), lower protection rod (F5.13.31) and upper protection rod (F5.1 3.32). Two lower protection rods (F5.13.14) and one upper protection rod (F5.1 3, 15) with strengthening link (F5.13.16). Push lock rod (F5.1 3,8) is equipped to lock sliding assembly (F5.13.3) in to possible positions in in lock down holes (F5.13.9).

6 Claims, 6 Drawing Sheets

(56) References Cited

U.S. PATENT DOCUMENTS

| | | | |
|---|---|---|---|
| 2,866,247 A | | 12/1958 | Clegg |
| 4,017,111 A | * | 4/1977 | Sandnes .................... B66C 1/14 |
| | | | 24/599.1 |
| 4,539,732 A | | 9/1985 | Wolner |
| 5,609,378 A | | 3/1997 | Bowers et al. |
| 7,607,707 B2 | * | 10/2009 | Eising ...................... B66C 1/34 |
| | | | 294/131 |
| 2011/0285157 A1 | * | 11/2011 | Bohler ..................... B66C 1/34 |
| | | | 294/82.11 |

FOREIGN PATENT DOCUMENTS

| | | |
|---|---|---|
| NO | 330034 | 4/2008 |
| SU | 552273 | 3/1977 |
| WO | WO2013/040637 | 3/2013 |

OTHER PUBLICATIONS

"Users Provide the New Imenco Shackle," 2009, Imenco AS. www.http://imenco.no/2009/01/2743/.

* cited by examiner

MEANS CONCERNING HOOK

CROSS-REFERENCE TO RELATED APPLICATIONS

This application is the U.S. national phase of PCT/NO2016/000028, filed on Nov. 7, 2016, which claims the benefit of Norwegian Patent Application Serial Number 20151544, filed on Nov. 12, 2015, the entire disclosures of both of which are incorporated herein by reference.

TECHNICAL FIELD

Invention concerning a locking unit, for mounting on a lifting hook of type "longshank", which belongs to an extra locking unit, in addition to what is common on a lifting unit/hook preventing that the load, unintentional is released from the hook. The invention supplies methods which also do loading and unloading of cargo, to an easy and fast operation. The product is made up to be fit for use under water operations, which include lifting operations from air to water and where attaching and releasing of cargo also includes use of ROV (remotely operated underwater vehicle). In our case, very often used in oil and fish farming industry.

BACKGROUND

When handling cargo hanging in a hook, there often are claims concerning security to prevent that cargo unintentional will is released from the hook. In the offshore field, a critical point when handling hanging cargo in the air from and from deck and specially in the "splash zone", where the cargo specially is exposed to be released by the waves and vessel movements, under which specified assumptions, are able to "lift" the cargo and influence traditional security units for heavy load and risk.

In addition will fast and reliable on- and offloading of cargo gives considerable reduce use of time during so called "critical lifting phase" as for example; time spent from time point when "installed cargo", to time point for "released installed cargo". This is phase or time which is tried to reduce to 3 minimum because of high risk, special when weather condition in the ocean surface is challenging for the ships position.

Concerning offshore oil industry, lift of cargo are done in surroundings which requires special claims for equipment in use. The mix of different elements and a sharply reduced visual control, which requires that claims to correct and secure operational function of the equipment is very high. For underwater operations, will also on and off handling the cargo of the hook be done by the ROV which limited suppleness and maneuverability.

This industry have therefor, in cooperation with the national authority, defined a number of guidelines for secure operational handling, during different such functional handling. For lifting equipment or hooks, the industry defines that the hook with sufficient security shall have two different locking mechanisms or security units. At least one of those shall have respectively a vertical and a horizontal movement according to each other.

In Norwegian oil industry are guidelines made of the industry organizations; IMCA and NORSOK GUIDE-LINES, which is normative for the industry in its whole.

They are lifting equipment which already satisfies these guidelines, but as a common they are complicated, expensive to produce and very consuming to operate. To reduce the price at a properly approved end equivalent equipment, is obviously competitive advantage.

It is also very important to be able to contribute reduce the operation time for the operator. In majority of all underwater operations there is enormously resource intensive to do these operations. The industry is searching tirelessly for new functions, procedures and/or innovative equipment which can contribute to reduce operational time. Our securing mechanism is very simple and fast to operate relative to other known 2-steps locking mechanisms. This will be a big competitive advantage.

Already known technical solutions for example: WO-2013040637-A1 where an extra safety device can be added to a standard shaft type of lifting hook. The extra safety device locks the original hook safety lip so it is prevented from being opened un-intentionally. The safety gate requires to be operated by either divers or ROV.

U.S. Pat. No. 219,677 and U.S. Pat. No. 2,603,524 describes a sliding arrangement to prevent load to unhook itself. The sliding movement, is secured by a locking likely unit.

Another known technic is: U.S. Pat. Nos. 2,866,247, 4,539,732 and GB-1.032.584 where a pivoting Sip closes the hook gate to prevent the load unhooking itself, None of these safety mechanics, except, WO-2013040637-A1, can be fitted to a standard long shank hook and none of these arrangements, add an extra safety latch to the hook, which is a demand from the oil industry.

SUMMARY

The purpose of this invention is to deliver a safety device to the industry that satisfies the following demands:
  Can he fitted/connected to a standard long shank lifting hook
  Double safety barrier comprising of two independent operated mechanisms to prevent uncontrolled release of the load attach to the hook.
  At least one of the mechanisms needs to be operated/released by adding both horizontal and vertical movement to be able to release lock.
  Easy for ROV to operate.

The purpose achieves by a wire equipped to a free end of a closing lip and trough guide eyes placed at the shank and further to a release handle and a lock system. The enclosed solution satisfies the following demands:
  Satisfies Oil Industry guidelines for double safety lock/latch when using hooks for lifting operations.
  Easy, strong and reliable construction with few moving parts.
  Low cost to both produce and sell/rent compared to other existing products in the market. This again leads to having a very competitive product in the chain of costs.
  Easy and fast to operate. This again leads to big benefits with regards to reduced operational and thus vessel time spent during subsea installation operations.
  Saves a lot of time during critical and expensive lifting operations, mainly in the oil/subsea industry.

BRIEF DESCRIPTION OF THE DRAWINGS

The invention is shown trough the following description of an example of design during referral to figures including the patent claims. The figures are as follow:

FIG. 1 shows a standard long shank shaft hook, which is the type of hook this invention is designed to be installed and used on.

DETAILED DESCRIPTION

In the following description of functionality and construction, attached drawings and pictures describe by notation XX,XX,XX where the first two letters specify figure, and the next two or three positions specifies the element in the figure it is referred to.

Figure 1:
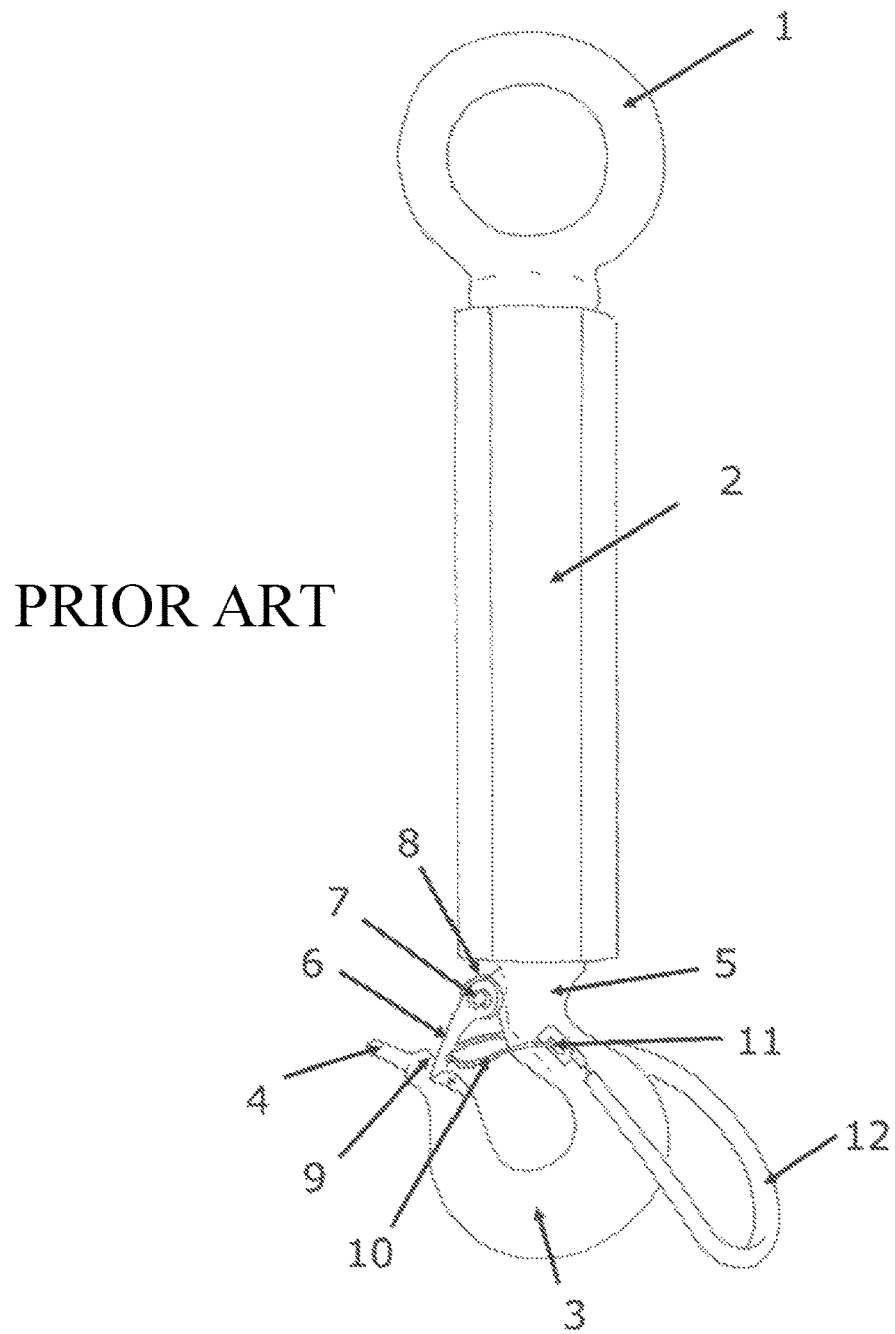
Figure 2:
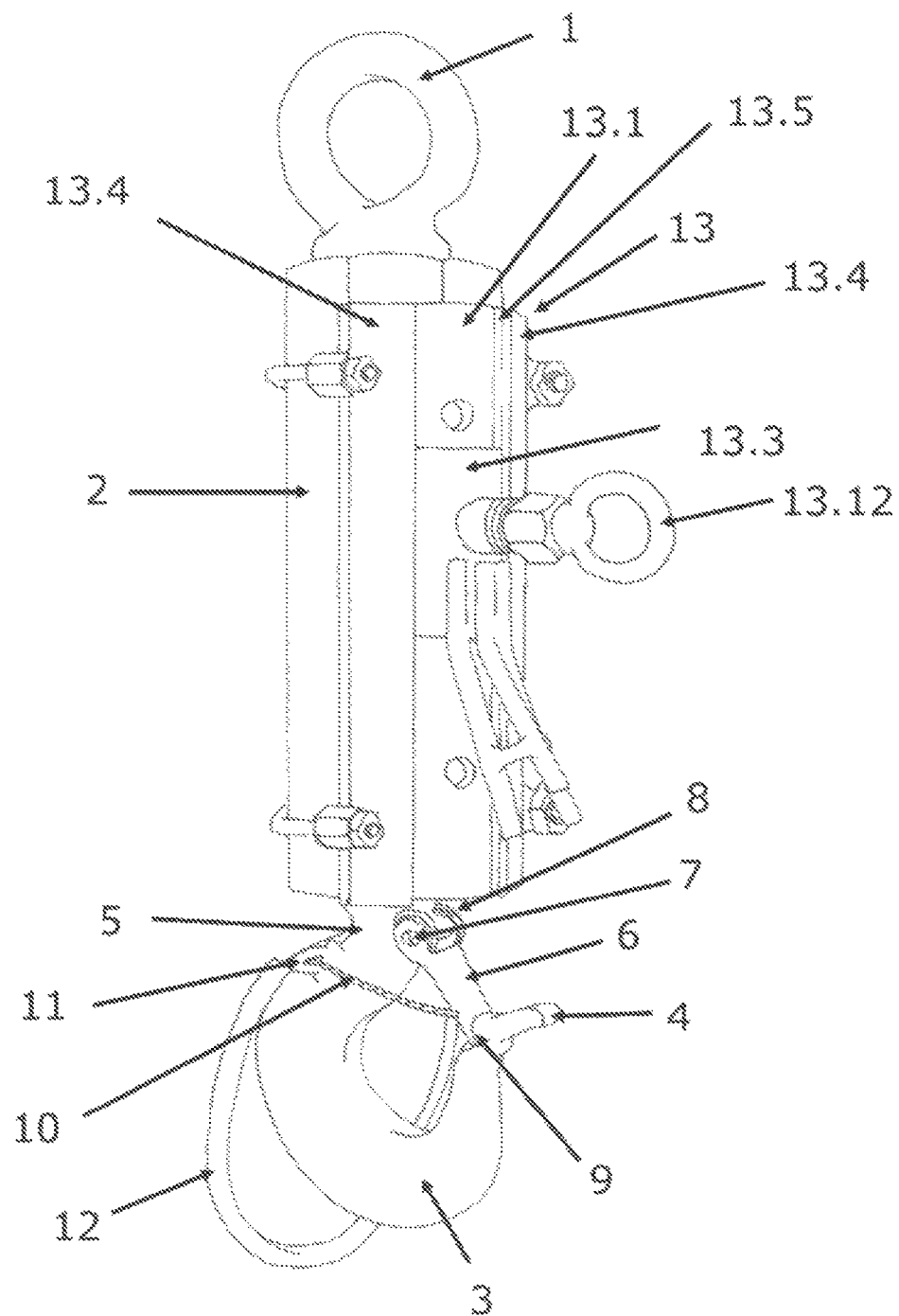
FIG. 2 shows the invention fitted to a standard type long shank hook with a standard hook gate locking lip and an additional safety mechanism to cover the hook gate completely. The locking system is closed and the safety mechanism open.

FIG. 1 (F1) shows a standard long shank hook normally used with crane wires and other lifting devices. It consists of three main parts. An attachment ring F1.1, a shaft F1.2 and in the other end of the shank F1.2 opposite the attachment ring F1.1 is equipped a hook F1.3.

The shank F1.2 has a hexagon type diameter, but this invention can easily he fitted together with a hook F1.3 of shank F1.2 type and with other geometrical shapes. The invention attachments can also easily be sized to fit shank F1.2 and hook F1.3 of other dimensions.

The attachment ring F1.1 is when in use equipped to a wire (not shown) as a part of winch system (not shown) for raise and lower the lifting hook.

At the hook F1.3 opening, between the hook F1.3, hook tip F1.4, and the hook shank F1.5, there is installed a closing lip F1.6, The closing lip F1.6, pivots around an axle F1.7, with a tension spring F1.8, installed for keeping the closing lip FI.6. In a closed position over the hook F1.3 open gate. The closing lip F1 .6 free and opposite the axle F1.7, will be forced by the tension spring F1.8 against the hook tip F1.4. The closing lip F1.6 will stop against a stop edge F1.9 so that the hooks F1.3 gate will be closed. To open the closing lip F1.6 must the free end be moved away from the stop edge F1.9 so that eventually hanging cargo on the hook F1.3 can he removed.

There is a manual release mechanism for the closing lip F1.6. The release mechanism consist of wire F 1.10, guide eyes F1.11 and a releasing handle F1.12. If one grab the release handle F1.12 and move if. against the hook shaft. F1.5 then will the closing lip F1.6 moves away from the stop edge F1.9 and the hook F1.3 will be open and hanging cargo at the hook F1.6 can he removed.

Figure 5:
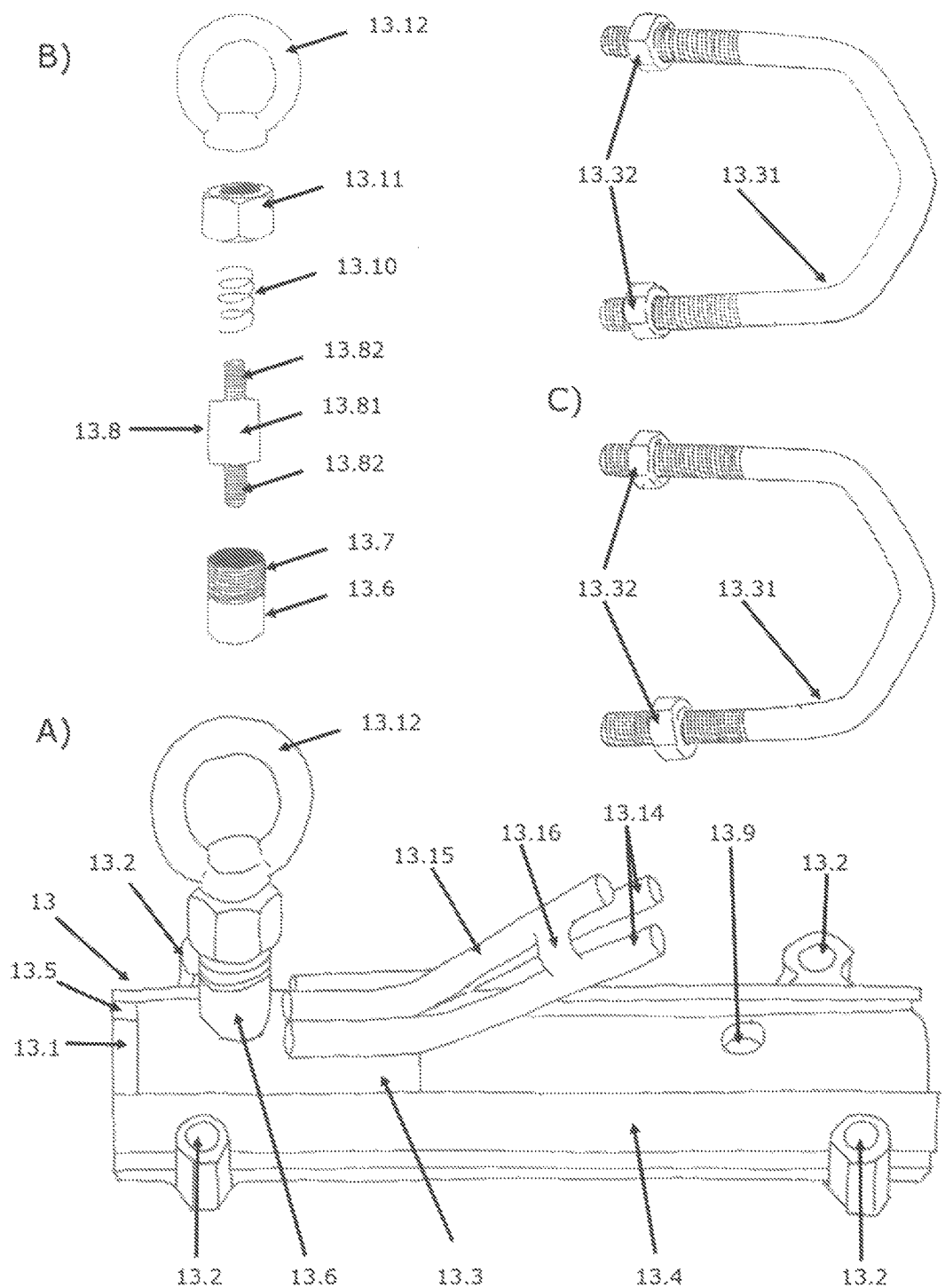
FIG. 5 shows one of safety mechanism not mounted to the shaft hook of shank type, in A) is the slider and bracket for the shaft at the hook, in B) position look for slider, and C) means for attaching the safety mechanism the shaft at the shank hook.

FIG. 5 (F5) shows details about the locking system F5.13, which used in combination with locking lip system (F1.6, F1.7, F1.8, F1.9, F1.10, F1.11 and F1.12), will give the hook assembly hanging in the hook F1.3, the additional safety demands and guidelines for hook safety to prevent, the load hanging In the crane hook F1.3 from un-hooking itself. The locking system functionality is made up as follows.

A bracket F5.13 is the safety mechanism for the hook F1.3 gate. This consist of rectilinear support assembly F5.13.1 which have a cross sectional made in right angle at the brackets F5.13 main lengthwise. The cross sectional have a form to rectilinear following plans similar to a third of the outline to a hexagon form. The form of the supporting assembly F5.13.1 will suit to be attached to the shaft of the hook. The supporting attachment F5.13,1 have four cylindrical bolt holes F5.13.2 equipped two at each short end of the supporting assembly F5.13.1 on the supporting assemblies F5.13.1. The bolt holes F5.13.2 will together with two V-bolts F3.13.31 and nuts F5. 13.32 hold the supporting assembly F5.13.1 and the hold safety mechanism to the hooks F1.2 shaft in a known manner.

The moving sliding assembly F5.13.3 is equipped to the main plan of the support assembly F5.13.1 at its side opposite where the support assembly F5.13.1 is placed at the shaft F1.2. The sliding assembly F5.13.3 considerable shorter in its lengthwise than the support assembly F5.13.1 and little narrower than it. Along the two parallel, vertical and longest edges of the support assembly F5.13.1 outsides are equipped at the same side as the sliding assembly F5.13.3 there are placed rails F5.13.4 which are equipped in a little distance from the support assembly F5.13.1. The distance between the support assembly F5.13.1, slide tracks F5.13.5 so that the sliding assembly F5.13.3 can move along the near to convex side of the support assembly F5.13. 1 and to stop near to the two shortest and parallel sides of the support assembly F5.13.1. The sliding assembly F5.13.3 is able to move along the front of the support assembly F5.13.1 from the one horizontal shortest outer edge to the other.

FIG. 5 (F5) shows more details concerning the safety mechanism. At the convex plane of the sliding assembly F5.13.3 which is faces from the support assembly F5.13.1, near to the upper short side of sliding assembly F5.13.3 is equipped a position lock assembly F5.13.6. This has a shape as and open cylinder where at its end against the sliding assembly F5.13.3 is a hole in the sliding assembly F5.13.3 which has a smaller diameter than the inner diameter of the position lock assembly F5.13.6. At the end of the position lock assembly F5.13.6 which longest from the sliding assembly F5.13.3 is there at the outer periphery top gangs F5.13.7.

Together with the position lock assembly F5.13.6 operates several other units. A push lock rod F5.13.8 with cylinder shape and a middle part F5.13.81 with slightly smaller outer diameter then the inner diameter of the position lock assembly F5.13.6. The end of the push lock rod F5.13.8 which will be closest to the sliding assembly F5.13.3 have a push lock pin F5.13.82 shaped near to a cylinder which is equipped with or without gangs. The push lock pin F5.13.82 have such a diameter that it can easy go through the hole in the sliding assembly F5.13.3 at the end of the position lock assembly F5,13.6 which is fix to the sliding assembly F5.13.3 in the opposite end of the push lock rod F5.13.8 from the push lock pin F5.13.82, there is cylinder shaped and lock rod upper threaded part F5.13.83 with about the same diameter as the push lock pin F5.13.82. A spiral tension spring F5.13.10 is put into the lock rod upper threaded part F5,13.83. When the push lock rod F5,13,8 and the tension spring F5.13.10 are put into the position lock assembly F5.13.6 a threaded cap F5.13.11 with inside gangs and hole in its other end puts over these and the threaded cap F5.13.11 screws to the to gangs F5.13,7. I this way will the push lock rod F5.13.8 and the tension spring F5.13.10 stay in the position lock assembly F5.13.6. A handle F5.13.12 is next screwed fix to the push lock pin F5.13.82, In the support assembly F5.13.1 near to the horizontal outer edges is equipped cylinder shaped holes, lock down holes F5.13.9. When one is drawing the handle F5.13.12 then the push look rod F5.13.8 is drawn with push lock pin F5.13.82 out of the neighboring lock down hole F5.13.9, the sliding assembly F5.13.3 is released from the support assembly F5.13.1 and is able to move along the support assembly F5,13.1.

At the sliding assembly F5.13.3 between the position lock assembly F5.13.6 and the horizontal outer edges which has the longest distance from the position lock assembly F5.13.6 the is equipped a hook tip safety unit. The unit have a shape near to a human nose. It consists of two lower protection rods F5.13.14 which in one end are parallel and have a little distance in between and fixed to the sliding assembly F5.13.3 and runs in direction away out over the nearest horizontal outer edge of the sliding assembly F5.13.3. From where the lower protection rods F5.13.14 are fixed and in direction against their free ends the lower protection rods F5.13.14 are breaking out from the main pan of the sliding assembly F5.13 3 like the sides of mentioned nose shape. In between these to lower protection rods F5.13.14 is fixed an upper protection rod F5. 13.15 which when leaving the sliding assembly F5.13.3 breaks from its main plan more than the lower protection rods F5.13.14 and so one is the nasal bridge. The protection rods F5.13.14, F5.13.15 are fixed to each other near at their free ends by a strengthening link F5.13.16.

Figure 3:
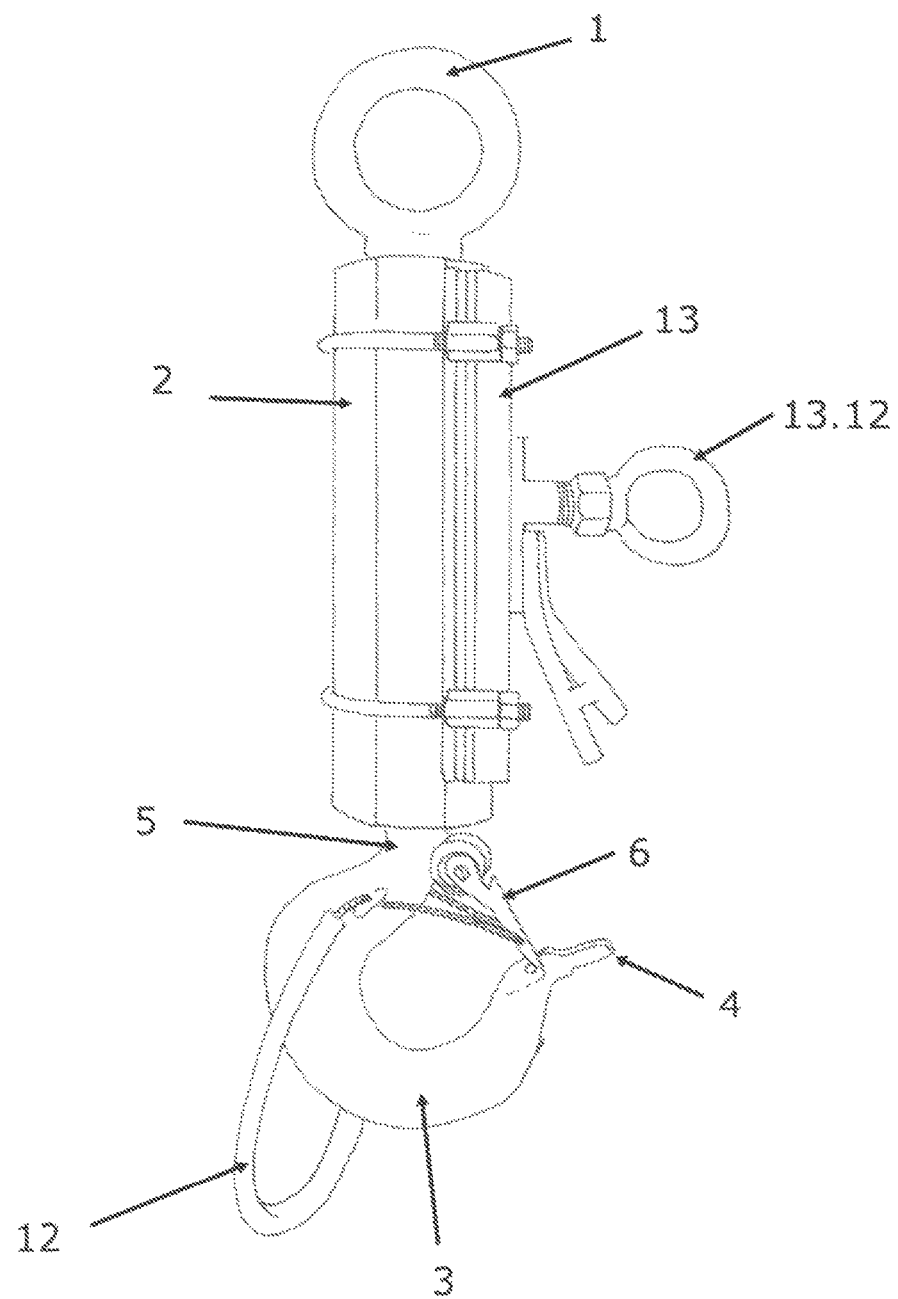
FIG. 3 shows the same as in FIG. 2, but as vertical view.
Figure 4:
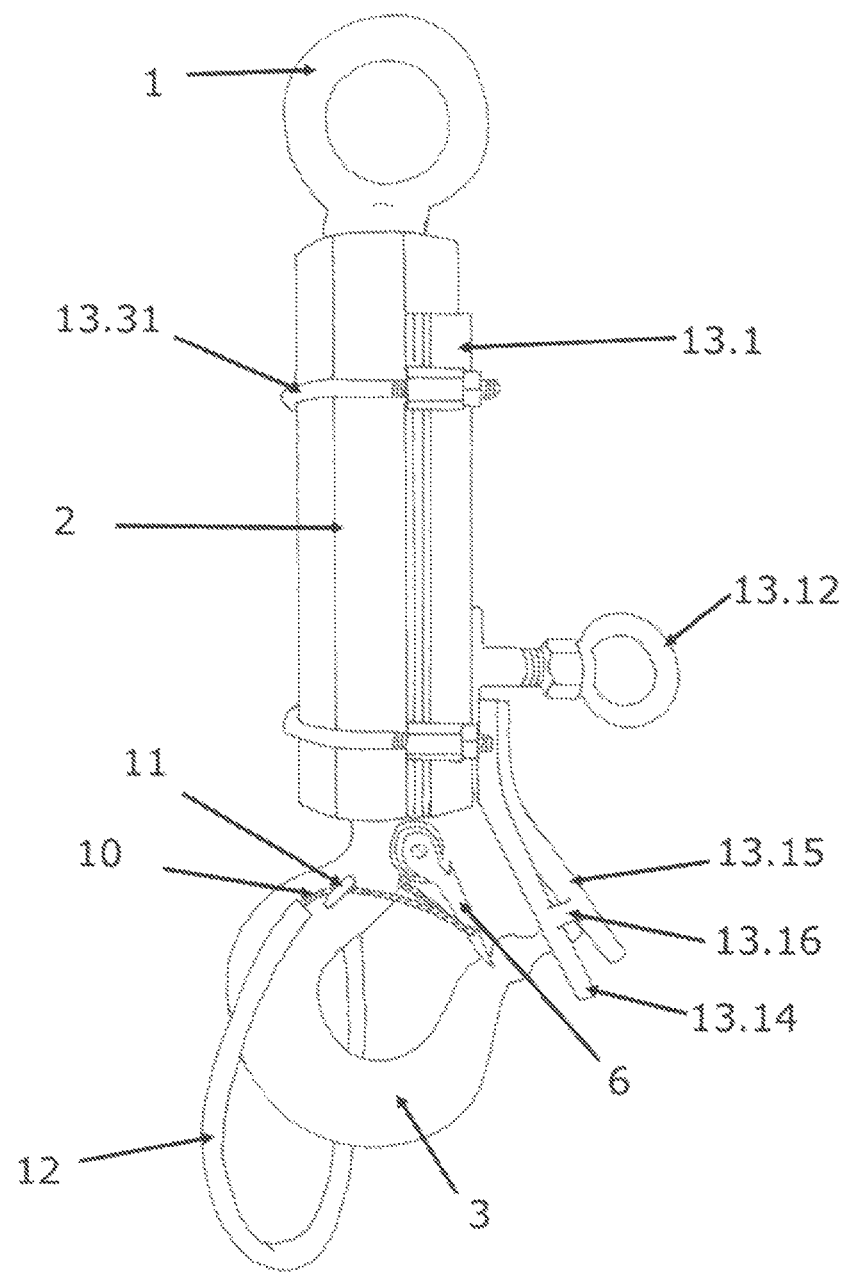
FIG. 4 shows the same as in FIG. 3, but both safety mechanisms closed.

FIG. 3 (F3) shows the sliding assembly F5.13.3 with the hook tip safety unit in a none secure position. When drawing the handle F3.13.12 then the push lock pin F5.13.82 will be moved out of the upper lock down hole F5.13.9, longest from the hook tip F3.4 and the sliding assembly F3.13.3 can be moved with the hook tip safety unit F5.13.14, F5.13.15, F5.13.16 in a way that it will over the hook tip F3.4. When the handle F5.13.12 is dropped then will the push lock pin F5.13.82 be moved by the tension spring F5.13.10 into the lock down hole F5.13.9 in the support assembly F5.13.9 near to the hook tip F3.4.

Both the release handle F3.12 and handle F5.13.12 can be operated under water in an easy an effective way by the arm of a ROV.

In this description is used a "longshank" ROV hook as examples which is the most used in the oil industry, but basically principles of the invention can easily be adapted for other types of ROV hooks in use.

The enclosed invention is by that not limited only to the described examples and considered also to cover other nearly and not described solutions.

Figure 6:
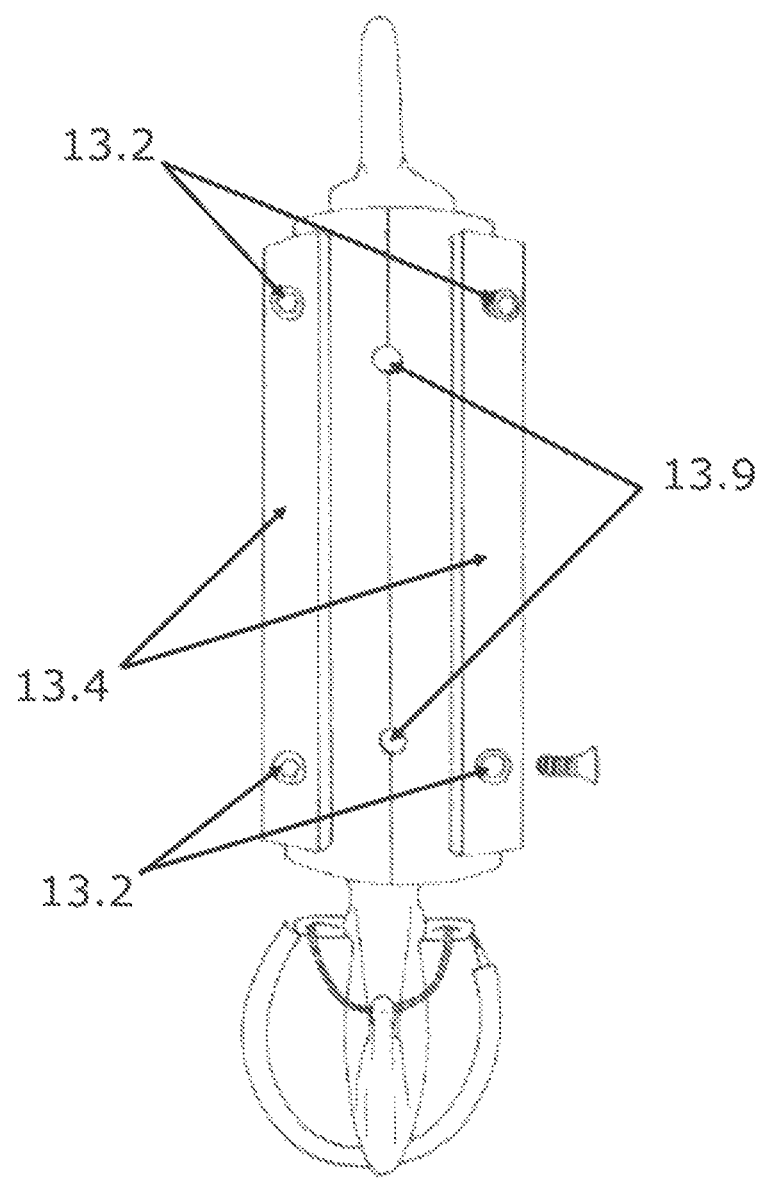
FIG. 6 shows a solution where the invention is attached directly at the shaft of the hook without use of means for attaching the safety mechanism as shown 1 FIG. 5, section C.

FIG. 6 shows a solution where the rails F6,13,4 are equipped directly at the shaft F1.2 to the hook. This example requires pre-fabricated and customized rod-holes F6.13.2 for mounting the rails F6.13.4 including lock down holes F 6.13.9.

The invention claimed is:

1. A lifting hook for securing a load comprising:
   a connecting ring,
   a shaft,
   a hook having a hook tip and a shank, the hook tip and the shank being spaced apart to define a hook opening,
   a closing system including a closing lip biased to a first position to block the hook opening, and a release mechanism having a handle operable to move the closing lip to a position where the hook opening is not blocked, the bias of closing system operable to return the closing lip to the first position, and
   a support assembly including a sliding assembly having a position lock assembly,
   wherein the position lock assembly includes a push lock rod, a tension spring, a threaded cap, and a handle, the push lock rod engageable with lock down holes formed in the shaft of the hook to positively lock the sliding assembly.

2. The lifting hook of claim 1, wherein the sliding assembly is movable between a first position where the sliding assembly engages the hook tip to block the hook opening and a second position where the sliding assembly is spaced apart from the hook tip so that the hook opening is not blocked.

3. The hook assembly of claim 2, wherein the sliding assembly includes a plurality of protection rods, the protection rods secured together by a link that engages the hook tip when the sliding assembly is in the first position.

4. The hook assembly of claim 3, wherein the protection rods are secured to a base of the sliding assembly and have free ends that extend away from the base of the sliding assembly, the strengthening link being secured near the free ends.

5. The hook assembly of claim 2, wherein along a parallel, vertical and longest side edge of the support assembly where the sliding assembly is moving are equipped rails fixed in a distance away form support assembly to form a slide track.

6. A lifting hook for securing a load comprising:
   a connecting ring,
   a shaft,
   a hook having a hook tip and a shank, the hook tip and the shank being spaced apart to define a hook opening, and
   a closing system including a closing lip biased to a first position to block the hook opening, and a release mechanism having a handle operable to move the closing lip to a position where the hook opening is not blocked, the bias of closing system operable to return the closing lip to the first position,
   further comprising a support assembly including a sliding assembly having a position lock assembly, the sliding assembly movable between a first position where the sliding assembly engages the hook tip to block the hook opening and a second position where the sliding assembly is spaced apart from the hook tip so that the hook opening is not blocked,
   wherein the position lock assembly is operable to positively lock the sliding assembly in either of the first or second positions, and
   wherein the position lock assembly includes a push lock rod, a tension spring, a threaded cap, and a handle, the push lock rod engageable with lock down holes formed in the shaft of the hook to positively lock the sliding assembly.

* * * * *